United States Patent
Lim (10) Patent No.: US 6,876,634 B1
(45) Date of Patent: Apr. 5, 2005

(54) ARCHITECTURE OF MOBILE COMMUNICATION SYSTEMS NETWORK AND METHOD FOR TRANSMITTING PACKET DATA USING THE SAME

(75) Inventor: Byung Keun Lim, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/348,828

(22) Filed: Jul. 8, 1999

Related U.S. Application Data (63) Continuation-in-part of application No. 09/223,754, filed on Dec. 31, 1998, now Pat. No. 6,519,235, and a continuation-in-part of application No. 09/224,053, filed on Dec. 31, 1998, now Pat. No. 6,404,754, and a continuation-in-part of application No. 09/223,190, filed on Dec. 30, 1998, and a continuation-in-part of application No. 09/190,613, filed on Nov. 12, 1998, and a continuation-in-part of application No. 09/176,199, filed on Oct. 21, 1998, now Pat. No. 6,349,224, and a continuation-in-part of application No. 08/978,619, filed on Nov. 26, 1997, now Pat. No. 6,038,224.

(30) Foreign Application Priority Data

Jul. 9, 1998 (KR) .......................................... 98/27670
Aug. 11, 1998 (KR) .......................................... 98/32614

(51) Int. Cl.⁷ ................................................ H04B 7/00
(52) U.S. Cl. ..................... 370/310.1; 370/328; 370/469
(58) Field of Search ........................ 370/310.1, 310.2, 370/313, 328, 338, 349, 469, 470, 493

(56) References Cited

U.S. PATENT DOCUMENTS

| | | | | |
|---|---|---|---|---|
| 5,708,655 A | * | 1/1998 | Toth et al. .................... | 370/313 |
| 5,889,770 A | * | 3/1999 | Jokiaho et al. ............. | 370/337 |
| 5,901,352 A | * | 5/1999 | St-Pierre et al. .......... | 455/426.1 |
| 5,953,331 A | * | 9/1999 | Duncan et al. ............. | 370/352 |
| 5,970,059 A | * | 10/1999 | Ahopelto et al. ........... | 370/338 |
| 5,978,386 A | * | 11/1999 | Hamalainen et al. ....... | 370/466 |
| 6,078,575 A | * | 6/2000 | Dommety et al. .......... | 370/338 |
| 6,134,230 A | * | 10/2000 | Olofsson et al. ............ | 370/337 |
| 6,185,204 B1 | * | 2/2001 | Voit ........................... | 370/352 |
| 6,327,267 B1 | * | 12/2001 | Valentine et al. .......... | 370/466 |
| 6,349,099 B1 | * | 2/2002 | Larikka et al. ............. | 370/395 |
| 6,389,039 B1 | * | 5/2002 | Katinakis et al. ........... | 370/474 |
| 6,400,712 B1 | * | 6/2002 | Phillips ....................... | 370/355 |
| 6,418,324 B1 | * | 7/2002 | Doviak et al. .............. | 455/556 |

OTHER PUBLICATIONS

Pils, C. et al "Wireless Internet Access wit DECT" Computer Communications and Networks, Oct. 12–15, 1998, pp. 630–637.*

* cited by examiner

*Primary Examiner*—Chi Pham
*Assistant Examiner*—Anh Vu H Ly
(74) *Attorney, Agent, or Firm*—Fleshner & Kim, LLP (57) ABSTRACT

Architecture of a mobile communication system network and method for transmitting a packet data using the same, which can minimize required signal links and interlocking lines, the architecture including a plurality of radio network controllers each connected to a plurality of base stations in a cell or a sector to which the network controller pertains for separating a packet data service path from a circuit data service path when a particular mobile station is matched to this core network, at least one mobile switching center connected to the plurality of radio network controllers in a region of the mobile switching center by an ATM switching system for routing an originating call from the mobile station or a terminating call to the mobile station, a VLR/HLR(Visitor location register/home location register) connected to the mobile switching center for managing mobility of the mobile stations, and at least one PDGN(Packet data gateway node) for routing a packet data provided from either the mobile switching center or an external network according to a terminating call side identification number.

25 Claims, 4 Drawing Sheets

ARCHITECTURE OF MOBILE COMMUNICATION SYSTEMS NETWORK AND METHOD FOR TRANSMITTING PACKET DATA USING THE SAME

This application is a continuation-in-part of application Ser. No. 08/978,619, filed Nov. 26, 1997 Now U.S. Pat. No. 6,038,224; Ser. No. 09/190,613 filed Nov. 12, 1998; Ser. No. 09/176,199 filed Oct. 21, 1998 Now U.S. Pat. No 6,349,224; Ser. No. 09/223,190 filed Dec. 30, 1998; Ser. No. 09/223,754 filed Dec 31, 1998 Now U.S. Pat No. 6,519,235, filed Dec. 31, 1998 now U.S. Pat. No. 6,404,754.

BACKGROUND OF THE INVENTION

1. Field of the Invention

The present invention relates to a mobile communication system, and more particularly, to an architecture of a mobile communication system network which can make connection to the Internet/a packet network from a mobile station, transmit a signal received from the Internet/the packet network to a moving mobile station, or support data communication between mobile stations; and a method for transmitting a packet data using the same.

2. Background of the Related Art

First generation terrestrial radio data communication uses an exclusive radio data communication network or a cellular communication system provided with a modem. On the other hand, second generation terrestrial radio data communication uses combined speech/data radio data communication employing digital cellular/PCS network. In the next generation communication, it is foreseen that there will be ceaseless development of high speed radio data services in a multimedia information based communication environment. That is, in place of exclusive speech or data communication service, multimedia service of, such as speech, data, text and image based on radio mobile communication service will be on the lead. Under this situation, the next generation mobile telephone system(IMT-2000) based on the cellular/PCS radio communication system network defines a communication system network such that a radio terminal can even provide a wideband multimedia service, studies for standardizing which is underway. For the success of global roaming service, high speed radio data service, and radio multimedia service, which are basic system requirements for the next generation mobile communication network, interlock both with the Internet, which makes global service, and a packet data communication system network is an essential requirement as set forth in the standard document(Q. 1701) of the ITU(International Telecommunications Union), presently. A draft for formulating a communication system network to implement such interlock with the Internet/packet network is suggested in the standard document Q. 1701 of the ITU.

Figure 1:
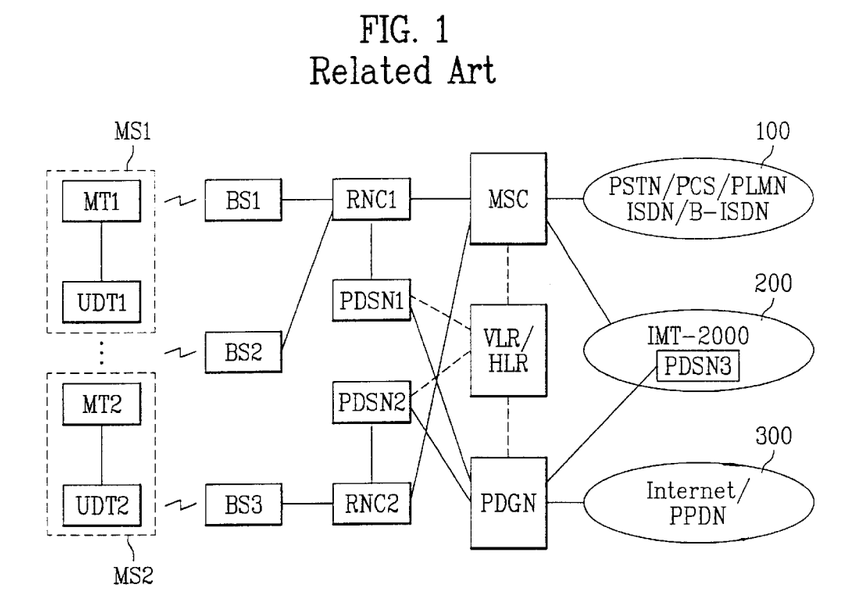
FIG. 1 illustrates a block diagram of a related art mobile communication system network.

FIG. 1 illustrates a block diagram of a related art mobile communication system network suggested in the ITU standard documents Q. 1701 and Q. 1711.

Referring to FIG. 1, one user data terminal UDT1 or UD12 and one mobile terminal MT1 or MT2 connected together form a mobile station MS1 or MS2 for providing a radio Internet and a packet data services. Each base station BS1-BS3 connects the mobile station MS1 or MS2 to a radio channel. Each of radio network controllers RNC1 and RNC2 is connected to a plurality of base stations BS1 and BS2 within a cell or a sector to which it pertains for separating packet data and circuit data service paths in matching with a core network using a channel assignment function varied with an service option of the mobile stations MS1 or MS2. A packet data serving node PDSN1 or PDSN2 is a physical element having a PSCF(Packet service control function) defined in the ITU standard document Q1711. And, a PDGN (Packet data gateway node) is a physical element having a PSGCF(Packet service gateway control function). The PDSN and the PDGN are radio packet data service elements, for transmitting a packet data, which is to be transmitted from the UDT (UDT1 or UDT2) to the Internet/packet network 300, from the RNC (RNC1 or RNC2) to the Internet/packet network 300 by packet switching. Since the PDSNs (PDSN1 and PDSN2) and the PDGN should always know positional movements of the mobile terminals MT1 and MT2 for switching a packet data, the PDSNs (PDSN1 and PDSN2) and the PDGN should have a signal line always connected to VLR/HLR(Visitor location register/home location register) and maintained. Therefore, in order to support a roaming service for a mobile station roamed into other communication company and a hand off service, the PDGN in a home network and the PDSN in a visit network should be connected with an NNI(Network to network interface).

However, the related art mobile communication system network has the following problems.

First, in the mobile communication system network as shown in FIG. 1, a continuous maintenance of a signal link between the PDSN and the PDGN is prerequisit for connection to the Internet/packet network from a particular mobile station. That is, when a mobile station executes hand-off frequently, either the PDSN in the home network and the PDSN in the visit network should be connected, or the PDGN in the home network and the PDSN in a visit network should be connected. Eventually, the packet data transmission under such communication environment causes complicated tangling of communication system networks.

Second, the requirement for registration of positional information of a mobile station roamed from a home network to a visit network on the VLR/HLR causes signal traffic between the PDSN and the VLR/HLR or the PDGN and the VLR/HLR every time a position registration or position verification is executed.

Third, as shown in FIG. 1, connection both of the PDSN and the PDGN to the VLR/HLR is required for implementing a mobile station position registration, which can not but greatly increase signal links for position registration or position verification of mobile stations if a plurality of PDSNs and/or PDGNs are operative in the communication system network shown in FIG. 1, that requires additional matching devices provided separately to the VLR/HLR for reduction of the increased communication links in the related art.

SUMMARY OF THE INVENTION

Accordingly, the present invention is directed to an architecture of a mobile communication system network and a method for transmitting a packet data using the same that substantially obviates one or more of the problems due to Limitations and disadvantages of the related art.

An object of the present invention is to provide an architecture of a mobile communication system network and a method for transmitting a packet data using the same, which can minimize required signal links and interlocking lines.

Other object of the present invention is to provide an architecture of a mobile communication system network and a method for transmitting a packet data using the same, which facilitates connection to the Internet/packet network from a mobile station, transmission of a signal received from the Internet/packet network to a moving mobile station, or supporting data communication between mobile stations.

Another object of the present invention is to provide an architecture of a mobile communication system network and a method for transmitting a packet data using the same, in which a particular mobile station can designate a particular PDGN directly for conducting a packet data service.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the architecture of a mobile communication system network includes a plurality of radio network controllers each connected to a plurality of base stations in a cell or a sector to which the network controller pertains for separating a packet data service path from a circuit data service path when a particular mobile station is matched to this core network, at least one mobile switching center connected to the plurality of radio network controllers in a region of the mobile switching center by an ATM switching system for routing an originating call from the mobile station or a terminating call to the mobile station, a VLR/HLR(Visitor location register/home location register) connected to the mobile switching center for managing mobility of the mobile stations, and at least one PDGN(Packet data gateway node) for routing a packet data provided from either the mobile switching center or an external network according to a terminating call side identification number.

In other aspect of the present invention, there is provided a method for transmitting a packet data in a mobile communication system network at least one radio network controller and position register and at least one PDGN, which are connected respectively in an ATM switching system centered on one mobile switching center, including the steps of (1) establishing a PPP link using a protocol stack having multiple layer between the particular radio network controller and the packet data node in response to a call connection request signal from the Internet or a packet network connected to the PDGN provided from an originating call side mobile station, (2) transmitting the packet data provided from the originating call side mobile station to the mobile switching center using the established link, and (3) the mobile switching center routing the packet data according to an identification number of a terminating call side PDGN included in the packet data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 2:
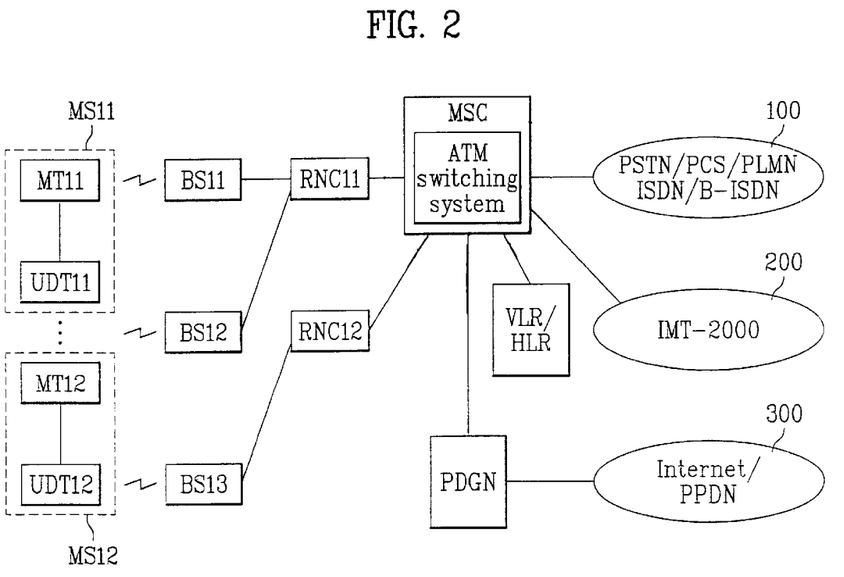
FIG. 2 illustrates a block diagram of a mobile communication system network in accordance with a preferred embodiment of the present invention.

Reference will now be made in detail to the preferred embodiments of the present invention, examples of which are illustrated in the accompanying drawings. The present invention can provide a radio data service suggested in the IMT-2000 network 200 based on a packet network interlock connection service, such as an Internet connection or X.25, the same as the variety of application services available in a wire network. FIG. 2 illustrates a block diagram of a mobile communication system network in accordance with a preferred embodiment of the present invention.

Referring to FIG. 2, the mobile communication system network in accordance with a preferred embodiment of the present invention includes a plurality of mobile stations MS11 and MS12 each having a user data terminal UDT11 or UDT12 for providing a data communication function and a mobile terminal MT11 or MT12 for providing a radio connection function with a serving base station, both are connected to each other, a plurality of base stations BS11–BS13 each for making a radio channel connection to the mobile terminals MT11 and MT12, a plurality of radio network controllers RNC11 and RNC12 each connected to a plurality of base stations BS11–BS13 in a cell or sector to which the radio network controller pertains for separating a packet data service path from a circuit data service path in matching a core network using a channel assignment function in a service option of the mobile station MS11 and MS12, a mobile switching center MSC of ATM switch type connected to a plurality of radio network controllers RNC11–RNC13 in a cell or a sector to which the mobile switching center MSC pertains for routing an originating call from the mobile station MS11 or MS12 or terminating call to the mobile station MS11 or MS12, a VLR/HLR (Visitor location register/home location register) connected to the mobile switching center MSC for managing mobility of the mobile stations MS11 and MS12, and a packet data gateway node for routing a packet data provided from either the mobile switching center or an external network according to an identifier included in the packet data. The mobile switching center MSC includes a communication network 100 having a PSTN(Public switched telephone network), a PCS(Personal communication system), PLMN(Public Land Mobile Network) and a B-ISDN (Broadband integrated services digital network), and an IMT-2000 network 200 connected thereto, and the PDGN includes the Internet/packet network 300 connected thereto. The PDGN and the Internet/packet network 300 may be connected with the Ethernet, a frame relay, or X.25 as the case demands. The PDGN and the mobile switching center MSC may be connected with a UNI(User Network Interface) in the B-ISDN. In the aforementioned communication system network, a packet data is transmitted from one user data terminal UDT11 or UDT12 to the PDGN on a data path set up in PPP(Point to Point) link. In this instance, the mobile switching center transmits the packet data received from the radio network controller RNC11 or RNC12 to the PDGN through the set up PPP link. The PPP is a link type used in the RFC 1661 serial link communication. Different from communication between terminals within an LAN or a packet switching network, since a packet data communication within the IMT-2000 network 200, such as a communication between particular mobile station MS11 and PDGN or between particular mobile stations MS11 and MS12 is a serial communication using a single path system of PPP, the packet data communication within the IMT-2000 network 200 is deemed optimal as a link layer protocol which connects both ends. And, in the present invention, preferably a dial up system is adapted to use an IPCP(PPP Internet Protocol Control Protocol) which conducts an IP assignment, and a link layer between the mobile station MS11 and the PDGN is set up by connecting to LCP(PPP Link Control Protocol).

All the mobile terminals MT11 and MT12 in the mobile communication system network shown in FIG. 1 should be provided with a terminal identifier for use in call connection to a circuit switching system expected to be used in basic speech communication services and multimedia communication services and a user data terminal identifier for an interlock call connection to an existing Internet packet network. That is, all the mobile terminals MT11 and MT12 should be assigned of an MIN(Mobile identification number) applicable to a general circuit switching network as a basic terminal identifier and should be selectively assigned of an Internet IP address or a packet address of a packet network as an SMIN(Supplementary mobile identification number) for a data. All terminating calls from all mobile stations MS11 and MS12 arrived to the PDGN from the Internet/packet network 300 are transferred to the mobile switching center MSC. Then, the mobile switching center MSC confirms a location of the mobile station through the VLR/HLR and sets up a transmission path of the packet data. Therefore, in the communication system network of the present invention, no more direct connection of the PDGN to the VLR/HLR required in the related art communication system network is required. Though the IMT-2000 network 200 in FIG. 2 may be deemed to be a radio network built up to a broadband communication network by itself, it acts as a wireless access network in view of interlock with the Internet/packet network 300. In this instance, a data path between the user data terminal and the PDGN is set up only in end-to-end as a serial communication circuit. Accordingly, as shown in FIG. 2, the PDSNs are removed, and the mobile switching center MSC is connected to the VLR/HLR, permitting to provide a simple communication system network with reduced signal traffic.

Moreover, the mobile communication system network of the present invention may be managed such that either the PDGN shown in FIG. 2 is connected to a plurality of mobile switching center MSC not shown in FIG. 2 or a plurality of PDGN not shown in FIG. 2 is connected to one mobile switching center MSC. Thus, the mobile communication system network of the present invention can be varied to suit to a communication situation. Since one wired communication system subscriber for the Internet/packet network 300 can only call a particular mobile station MS11 at the SMIN for data assigned from the mobile communication system network, the PDGN is taken as a subnetwork representing a data network the user data terminal UDT11 with the SMIN belongs thereto or as a packet network node, and, in view of the user data terminal UDT11, a home network for data of the user data terminal is the mobile switching center MSC having the PDGN connected thereto, of which SMIN address represents a data network. In the mobile communication system network of the present invention, as the VLR/HLR having the MIN registered thereon also manage the SMIN, the data communication network and the speech and multimedia service home network are always identical.

A method for transmitting a packet data using a mobile communication system network for providing various radio data service based on the aforementioned mobile communication system network will be explained.

Internet/Packet Network Connection Service

A particular mobile station may call at and make connection to an Internet or a packet data communication system network remotely, to make connection to an Internet server or a data base in a host computer connected to the packet network. Such a connection service can be made available by providing a radio data transmission function and a gateway function corresponding to a dial-up PPP service function and a PAD(Packet assembly de-assembly) service function of a wired network to a mobile communication system of the present invention. As such a connection service is a call to a host or server in the packet network from the mobile station, a temporary IP address may be assigned for making communication. In this instance, an IP address for SMIN of the user data terminal is not required.

Internet Protocol Service by Mobile Station

A particular mobile station, not only can make a call to the Internet using an IP address for an SMIN, a user data terminal identifier and be provided with various application services, even if the mobile station is moving, but also, acting as a host, allows an Internet user to make call at a permanently assigned SMIN IP address of the user data terminal therein for being provided with various application services. This protocol service is made available as the IMT-2000 network 200 provides a function for supporting an IP mobility of the mobile station.

Packet Data Services Between Mobile Stations

The aforementioned two services are on data communications between a mobile station and a stationary data terminal. However, it is foreseen that radio data communications between mobile stations will be required inevitably provided that communication services based on an actual radio data communication and the IMT-2000 network become active. Therefore, a data communication protocol should be supported for supporting the radio data communications between mobile stations, effectively. In an embodiment of the present invention, a data communication call between mobile stations are made using the SMIN. In this instance, no circuit switching system is used, but a packet switching system is used, for improving an allowable number of a radio communication service subscriber in a base station. A radio data communication call or connection between mobile stations(MT/UDTs) can be made possible by calling at the SMIN or MIN using an APPL or AI layer of the mobile station(MT/UDTs) of the mobile station shown in FIG. 3. In this instance, the PDGN is not involved, but the radio network controller and the mobile switching center MSC on an originating mobile station(MT/UDT) side and the radio network controller and the mobile switching center MSC on a terminating mobile station(MT/UDT) side are only involved.

PDGN Designation Service

A PDGN designation service is provided in a mobile communication system network having a plurality of PDGNs provided thereto, in which a particular user data terminal UDT may directly designate a particular PDGN for calling a desired subscriber. Irrespective of an entire mobile communication system network shown in FIG. 1 or 2, this service is available from all communication system networks provided with a plurality of PDGNs. That is, referring to FIG. 2, if it is assumed that the plurality of PDGNs are provided, the radio network controllers RNC11 and RNC 12 and the mobile switching center MSC can identify each of the PDGNs, and a proper address at which each of the user data terminals UDT can make a call is given to each of the PDGNs. Therefore, when a particular user data terminal UDT requests for a packet data service, a desired particular PDGN may be designated. That is, according to such PDGN designation method, if a PDGN designation identifier field provided in a packet service request originating message from the particular user data terminal has a identifier ID, a radio network controller and a mobile switching center set up a packet call path to be through one of the PDGN designated by the identifier ID. The mobile communication system network is preferably managed such that the user data terminal UDT provides a packet data service limited to a user who provides an exact password and subscriber's name after the PDGN is designated. Even if a call is handed off or roamed due to movement of the user data terminal UDT into corresponding mobile switching center or another mobile switching center under a state a packet data service is underway in the PDGN designation service procedure, the path between the user data terminal UDT and the PDGN is sustained continuously by an interlocked control of the base station BS, the radio network controller RNC and the mobile switching center MSC provided in the mobile communication system network. Eventually, even if the user data terminal UDT is handed off or roamed, the packet data service is provided continuously. Accordingly, when a plurality of PDGNs are managed by ISP connection equipment, many subscribers can be provided with a variety of packet data services.

Figure 3:
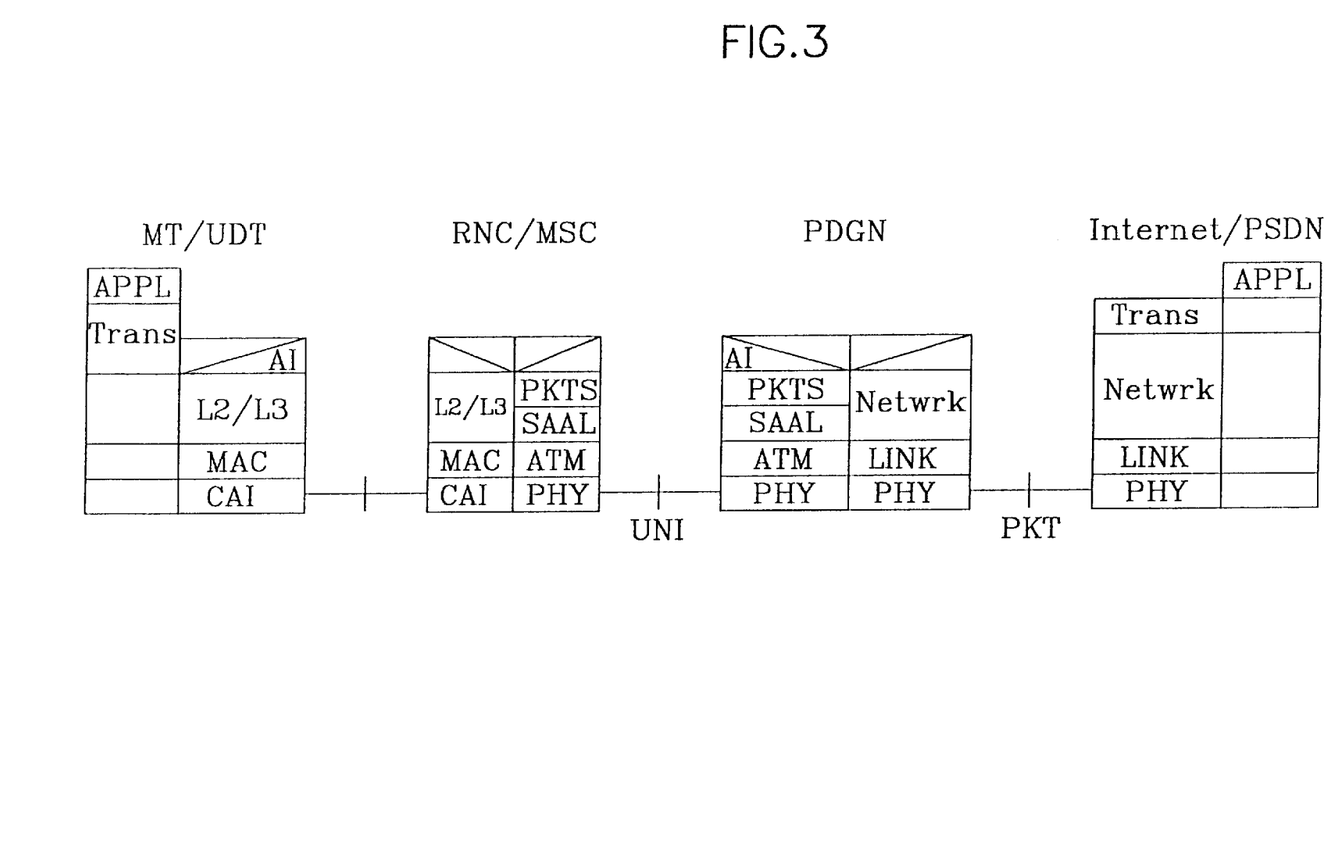
FIG. 3 illustrates a protocol stack for conducting a data communication using the Internet/packet network in accordance with a preferred embodiment of the present invention.

A signal protocol and a data protocol in accordance with a preferred embodiment of the present invention will be explained with reference to FIGS. 3-5. FIG. 3 illustrates a protocol stack architecture of a packet route control signal in accordance with a preferred embodiment of the present invention. Referring to FIG. 3, the AI(Application Interface) layer in the mobile station MT/UDT is provided for use in an Internet/packet network connection service for a user without a proper SMIN in making connection to an AI layer in the PDGN, and also supports a function for selecting an Internet connection or a packet network connection. An APPL layer in the mobile station MT/UDT is an Internet application service or a packet application layer. If a user data terminal UDT with an SMIN makes connection to an Internet IP or a packet host, the APPL layer in the mobile station MT/UDT, determining the connection as a call for an already registered service between transmission layers, connects the call to the PDGN. On the other hand, an APPL layer in the Internet/packet network 300 in FIG. 3 is an element used in calling an SMIN data address assigned to the user data terminal UDT by a user in a wired network. A radio network controller RNC side base station is omitted from elements in a RNC/MSC shown in FIG. 3, because it is understood that a radio packet data control between a mobile terminal MT and a radio access network is made between the mobile terminal MT and the radio network controller RNC. In a signalling system of PKTS(Packet signalling) between a PDGN and a mobile switching center MSC, a UNI(User network interface) suggested in an ITU standard document Q.2931 is employed. However, in the present invention, a function is added, in which a channel transits from an active state to a dormant state for an effective use of sources of a wireless section and the mobile switching center MSC when there is no user data present for a preset period even if a call is not canceled, and a terminating call identifier identifying function using an SMIN number is added for processing terminating calls from originating call side mobile stations in an Internet/packet network. And, a packet control protocol 'Radio Packet Signalling' for radio sections of the mobile station MT/UDT and the radio network controller RNC conducts a PSCAF (Packer Service Control Agent Function) of the mobile station (MT/UDT) and a PSCF (Packet Service Control Function) of the radio network controller. And, the radio network controller RNC and the mobile switching center MSC renews a routing table in hand off and roaming for assuring a packet path between the PDGN and the mobile station MT/UDT. If a roamed mobile station MT/UDT intends a connection to the Internet/packet network, the connection is made via a PDGN in a visitor network when the connection is made in a dial up system. On the other hand, when an SMIN of a user data terminal UDT is used, the connection can be made via a PDGN in a home network after passing through the mobile switching center MSC in the visitor network and the mobile switching center MSC in the home network.

Figure 4:
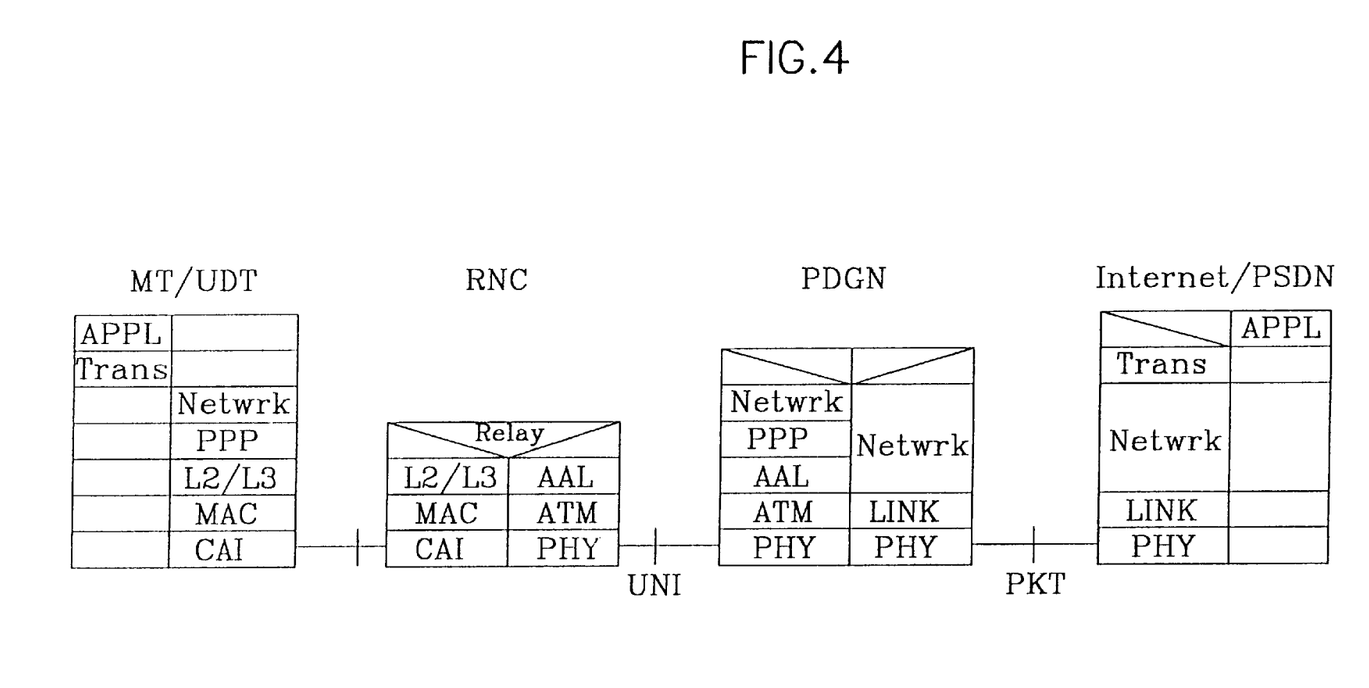
FIG. 4 illustrates a protocol stack for conducting packet path control in accordance with a preferred embodiment of the present invention; and, FIG. 5 illustrates a protocol stack for conducting packet data communication between mobile stations in accordance with a preferred embodiment of the present invention.

FIG. 4 illustrates a protocol stack architecture for conducting a data communication based on an Internet/packet network in accordance with a preferred embodiment of the present invention. Once a serial communication path is established according to the signal protocol explained with reference to FIG. 3, an architecture of data communication protocol stack between the mobile station MT/UDT and the Internet server or the packet host is provided as shown in FIG. 4. Elements of the mobile switching center MSC is not shown in FIG. 4 since the elements only relay in an ATM layer. In FIG. 4, the relay layer in FIG. 4 is L2/L3/MAC layer and ATM/AAL layer, and a link layer is connected with a PPP link, and rest of the overlying layers are network layers and a transport layers. The network layer may vary with user service. In an Internet connection using an SMIN and a radio X.25 packet network connection, the network layer in the PDGN is not used except relay function and operative as a peer part with the network in the mobile station MT/UDT.

Figure 5:
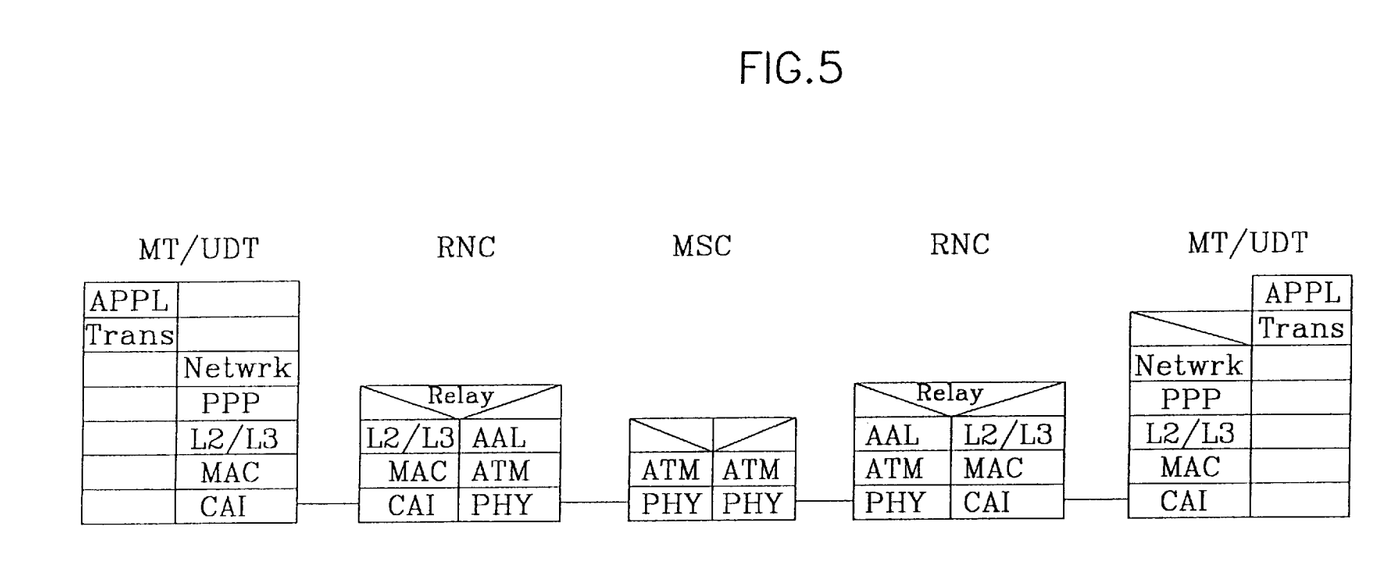

FIG. 5 illustrates a protocol stack for conducting packet data communication between mobile stations in accordance with a preferred embodiment of the present invention.

Referring to FIG. 5, the AAL(ATM Adaption Layer) which transmits a PPP frame may be one which requires no more re-transmission function or an error correction function as overlying layers conduct error correction. However, if a radio link protocol layers L2/L3 corresponding to a radio section have a re-transmission function, the AAL preferably has a flow control function for effective buffer management when a frame error is occurred in a radio section. The packet data communication between mobile stations shown in FIG. 5 is made possible as peer protocol layers corresponding to each other are put into operation centered on the mobile switching center. Underlying layers of the PPP layer conducts a function connecting end to end, and overlying layers of the PPP layer makes a flow control and an error correction, and supports application services.

As has been explained, the present invention can minimize interlock circuits required in packet data transmission/ reception even after PDSNS are removed from a related art mobile communication system network. Even though the PDSNS are eliminated from the mobile communication system network, which requires frequent hand off of mobile stations, a number of signal links required for position registration and confirmation of the mobile station is significantly reduced compared to the related art because the VLR/HLR directly connected to the mobile stations makes position registration and confirmation of the mobile stations.

And, the basic radio data connection services, such as the Internet/packet network connection service, the Internet protocol service for mobile stations, the packet service between mobile stations, provided based on the mobile communication system network of the present invention can provide all data communication application services that are available from a present wired network.

And, a variety of packet data services can be provided if a plurality of PDGNs are provided to the mobile communication system network of the present invention because a mobile station can directly designate a particular PDGN for transmitting/receiving a packet data.

It will be apparent to those skilled in the art that various modifications and variations can be made in the architecture of a mobile communication system network and the method for transmitting a packet data using the same of the present invention without departing from the spirit or scope of the invention. Thus, it is intended that the present invention cover the modifications and variations of this invention provided they come within the scope of the appended claims and their equivalents.

What is claimed is:

1. An architecture of a mobile communication system network comprising:
    a plurality of radio network controllers each connected to a plurality of base stations in a cell or a sector to which the network controller pertains for separating a packet data service path from a circuit data service path when a particular mobile station interlocks with the network;
    at least one mobile switching center connected to the plurality of radio network controllers in a region of the mobile switching center by an ATM switching system for routing an originating call from the mobile station or a terminating call to the mobile station;
    a VLR/HLR connected to the mobile switching center for managing mobility of the mobile stations;
    at least one PDGN for routing a packet data provided from either the mobile switching center or an external network according to a terminating call side identification number; and
    wherein the mobile switching center is a home network of the mobile station, the mobile switching center is connected to the PDGN having a subnetwork address in which a Supplementary Mobile Identification Number (SMIN) is part of the communication system network and is associated with the mobile station, wherein the mobile communication system is provided without any packet data service node.

2. An architecture as claimed in claim 1, wherein a packet data path set up between the mobile station and the PDGN is in PPP (Point to Point) when the packet data is transmitted in the mobile communication system network.

3. An architecture as claimed in claim 1, wherein the mobile switching center makes routing such that the packet data from the mobile station is transmitted to a particular PDGN and the packet data arrived to the PDGN for reaching to the mobile station is received and transmitted to a terminating call side mobile station.

4. An architecture as claimed in claim 3, wherein the mobile switching center makes confirmation on a position of the mobile station through the HLR/VLR before setting up a packet data transmission path.

5. An architecture as claimed in claim 1, wherein one PDGN is connected to the plurality of the mobile stations or a plurality of the PDGNs are connected to one mobile station.

6. An architecture as claimed in claim 1, wherein the VLR/HLR manages a mobile identification number (MIN) and the SMIN at a same time.

7. An architecture as claimed in claim 6, wherein the MIN is different than the SMIN.

8. An architecture as claimed in claim 1, wherein each of the PDGNs is given a proper packet node identifier for identifying a packet provided by a user of the mobile station.

9. An architecture as claimed in claim 1, wherein the mobile station is associated with a mobile identification number (MIN) in addition to the SMIN.

10. An architecture as claimed in claim 1, wherein the mobile switching center is the home network for data of the mobile station.

11. An architecture as claimed in claim 10, wherein the SMIN corresponds to an address in a data network.

12. An architecture of a mobile communication system network comprising:
    a plurality of radio network controllers each connected to a plurality of base stations in a cell or a sector to which the network controller pertains for separating a packet data service path from a circuit data service path when a particular mobile station interlocks with the network;
    at least one mobile switching center connected to the plurality of radio network controllers in a region of the mobile switching center by an ATM switching system for routing an originating call from the mobile station or a terminating call to the mobile station;
    a VLR/HLR connected to the mobile switching center for managing mobility of the mobile stations;
    a least one PDGN for routing a packet data provided from either the mobile switching center or an external network according to a terminating call side identification number; and
    wherein a wired communication system subscriber can make a call to a particular mobile station in the mobile communication network only at a Supplementary Mobile Identification Number (SMIN), and the PDGN becomes a subnetwork representing a communication system network to which the particular mobile station having the SMIN belongs, wherein the mobile communication system is provided without any packet data service node.

13. An architecture as claimed in claim 12, wherein the mobile station is associated with a mobile identification number (MIN) in addition to the SMIN.

14. An architecture as claimed in claim 12, wherein the MIN is different than the SMIN.

15. An architecture as claimed in claim 12 wherein the mobile switching center is a home network for data of the mobile station.

16. An architecture as claimed in claim 15, wherein the SMIN corresponds to an address in a data network.

17. A method for transmitting packet data in a mobile communication system network, the mobile communication system network having at least one radio network controller and position register and at least one PDGN, which are connected respectively in an ATM switching system centered on one mobile switching center, the method comprising:

(1) designating a PDGN based on a packet node identifier and establishing a PPP link using a protocol stack having multiple layers between a radio network controller and the PDGN in response to a call connection request signal from an originating call side mobile station;

(2) transmitting the packet data provided from the originating call side mobile station to the mobile switching center using the established link; and (3) the mobile switching center routing the packet data according to an identification number of a terminating call side PDGN included in the packet data.

18. A method as claimed in claim 17, further comprising the originating call side mobile station communicating to an Internet connected to the terminating call side PDGN or a packet network.

19. A method as claimed in claim 18, wherein the originating call side mobile station has an IP address assigned thereto for communicating to the Internet or the packet network.

20. A method as claimed in claim 18, wherein the originating call side mobile station can communicate to the Internet using the IP address for use in identification of a user data terminal in the originating call side mobile station even if the originating call side mobile station is roamed from the mobile communication system network to another network.

21. A method as claimed in claim 18, wherein the Internet user calls at an IP address of an SMIN of the user data terminal in the mobile station.

22. A method for transmitting a packet data in a mobile communication system network, the mobile communication system network having at least one radio network controller and position register and at least one PDGN, which are connected respectively in an ATM switching system centered on one mobile switching center, the method comprising:

establishing a PPP link using a protocol stack having multiple layers between a radio network controller and a packet data node in response to a call connection request signal from an originating call side mobile station;

transmitting the packet data provided from the originating call side mobile station to the mobile switching center using the established link;

the mobile switching center routing the packet data according to an identification number of a terminating call side PDGN included in the packet data; and designating a PDGN in an identifier field, the identifier field has an identifier ID in a packet service requesting originating call message from a user data terminal in the originating call side mobile station for setting up a packet call path through the PDGN designated by the identifier ID by a particular base station controller provided both to the mobile station and the system network.

23. A method for transmitting a packet data in a mobile communication system network, the mobile communication system network having at least one radio network controller and position register and at least one PDGN, which are connected respectively in an ATM switching system centered on one mobile switching center, the method comprising:

establishing a PPP link using a protocol stack having multiple layer between a radio network controller and a packet data node in response to a call connection request signal from an originating call side mobile station;

transmitting the packet data provided from the originating call side mobile station to the mobile switching center using the established link;

the mobile switching center routing the packet data according to an identification number of a terminating call side PDGN included in the packet data; and wherein once the terminating call side PDGN is designated, the terminating call side PDGN is permanently anchored even though the originating call side mobile station moves from one location to another.

24. A mobile communication system network, comprising:

a plurality of radio network controllers each connected to a plurality of base stations, the plurality of radio network controllers being adapted to separate a packet data service path from a circuit data service path;

at least one mobile switching center connected to the plurality of radio network controllers by a switching system, the at least one mobile switching center being adapted to route an originating call from a mobile station or a terminating call to the mobile station;

a location register connected to the at least one mobile switching center, the location register being adapted to manage a mobility of the mobile station;

at least one packet data gateway node connected to the at least one mobile switching center, the packet data gateway node being adapted to route a packet data provided from either the at least one mobile switching center or an external network according to a terminating call side identification number; and the mobile communication system network not including a packet data service node.

25. A method for transmitting packet data in a mobile communication system network, comprising:

(1) establishing a point to point link using a protocol stack having multiple layers between a radio network controller and a packet data gateway node in response to a call connection request signal from an originating call side mobile station through a Internet or a packet network connected to the packet data gateway node;

(2) transmitting the packet data provided from the originating call side mobile station to a mobile switching center using the established link; and (3) routing the packet data through the mobile switching center without using a packet data service node according to an identification number of a terminating call side PDGN included in the packet data.

* * * * *